Figure 1:
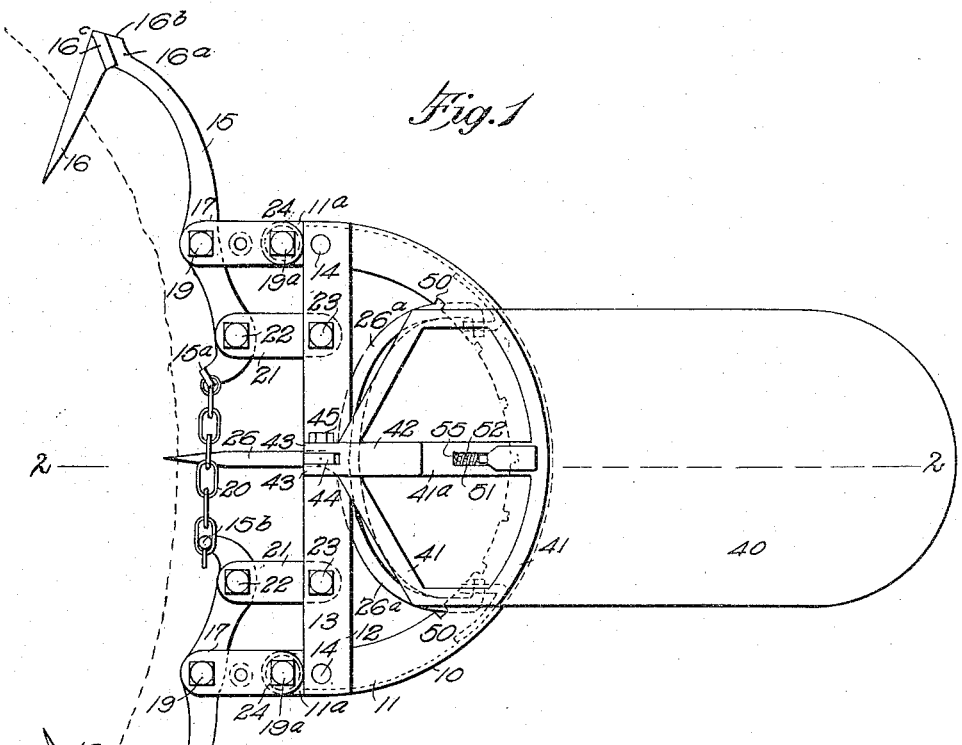

J. SAMUELSON.
TREE BOARD.
APPLICATION FILED JAN. 12, 1916.

1,195,740.

Patented Aug. 22, 1916.
2 SHEETS—SHEET 1.

WITNESSES

INVENTOR
John Samuelson
BY
ATTORNEYS

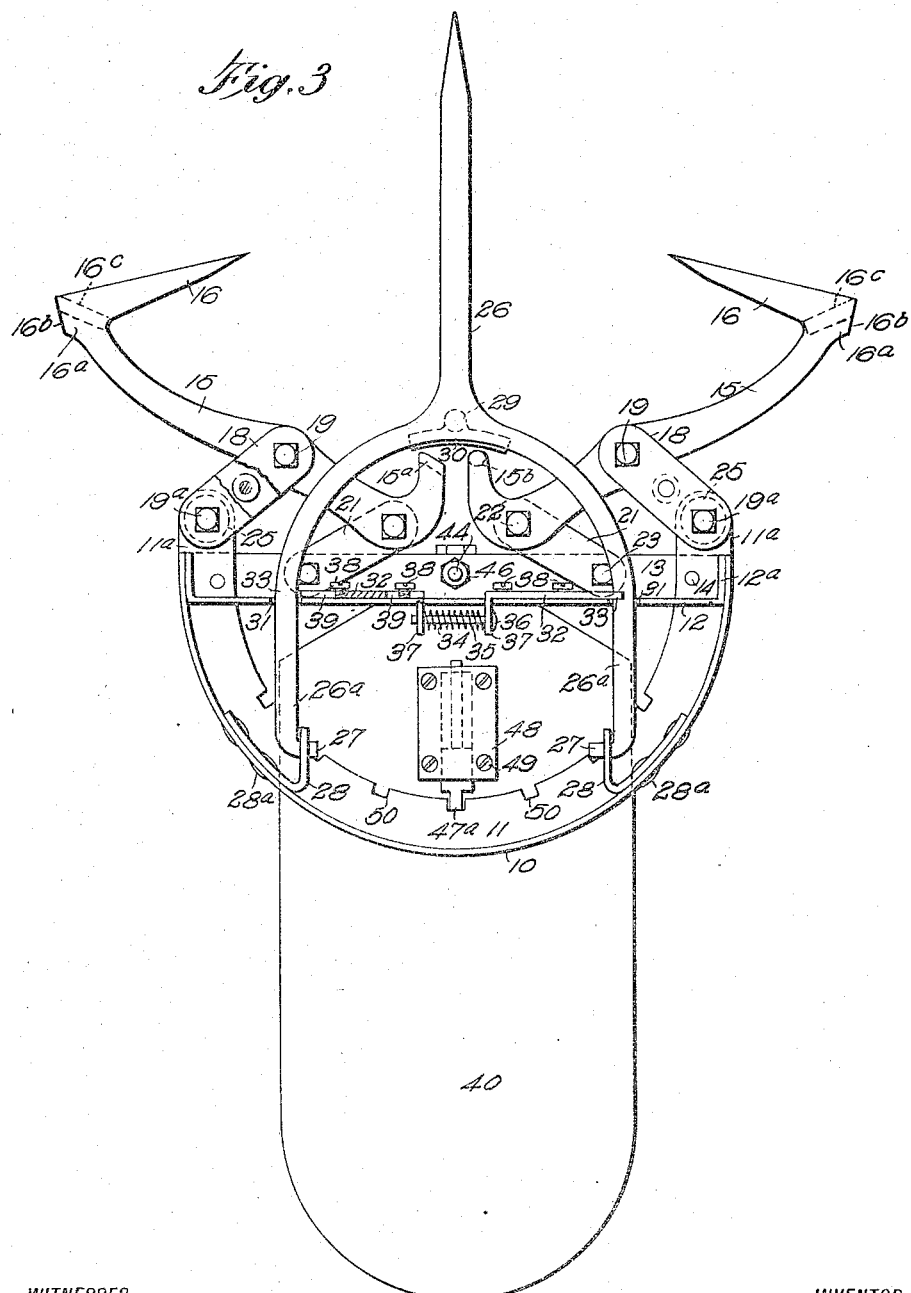

the tree trunk at a point below the grabs

UNITED STATES PATENT OFFICE.

JOHN SAMUELSON, OF PORTLAND, OREGON.

TREE-BOARD.

1,195,740.

Specification of Letters Patent.

Patented Aug. 22, 1916.

Application filed January 12, 1916. Serial No. 71,719.

*To all whom it may concern:*

Be it known that I, JOHN SAMUELSON, a citizen of the United States, and a resident of Portland, in the county of Multnomah and State of Oregon, have invented a new and Improved Tree-Board, of which the following is a full, clear, and exact description.

My invention relates to boards for use by tree fellers to attach to the tree and constitute a platform for the tree feller. With the tree boards, as ordinarily formed, it is necessary to cut three notches in the tree in order to differently position the board in working on the tree. The cutting of the notches consumes much time, it taking for large trees, about two hours for two men, the notches being from four to ten feet from the ground in order to cut the tree above the thickest portion adjacent to the root.

The prime objects of my invention are to produce a tree-felling board that may be quickly applied to the tree without the necessity of cutting notches in the latter; and to provide for the quick adjustment of the board to move the same to an angle to differently position the board for cutting at different sides of the tree.

Further objects of the invention are to provide means to securely retain the board in adjusted position and to so construct and arrange the parts that elements of the supporting structure for the board may be folded into compact form and retained against accidental displacement for convenience in carrying the structure.

Other important advantages, as well as the distinctive features of my invention, will appear from the more specific description following.

Reference is to be had to the accompanying drawings forming a part of this specification in which similar reference characters indicate corresponding parts in all the views.

Figure 2:
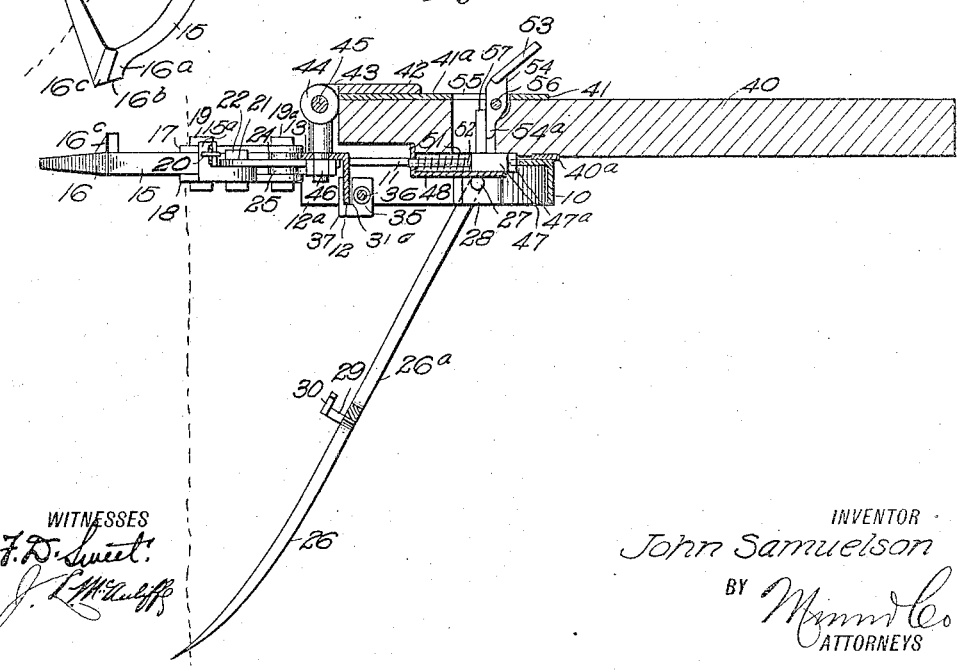

Figure 1 is a plan view of my improved tree board including its supporting means; Fig. 2 is a longitudinal vertical section on the line 2—2 of Fig. 1; and Fig. 3 is an inverted plan view with a pivoted supporting leg comprised in the structure, and folded into a plane substantially parallel with that of pivoted tree-engaging grabs.

In carrying out my invention in practical form in accordance with the illustrated example, a semi-circular frame 10 is provided preferably of angle iron, presenting a horizontal top flange at 11. Near the ends of the sector frame cross bar 12 extends which also is of angle iron, presenting a top flange 13. Said cross bar may be secured in any suitable manner as by rivets 14 or the like. I have shown the end extensions 12$^a$ of the vertical member of the cross bar 12 turned inwardly against the adjacent ends of the vertical member of the curved bar 10, whereby to increase the strength of the structure.

Supported on the frame are tree grabs 15, which present inwardly disposed spurs 16 to be driven into the tree. In the present example the grabs 15 are connected with the frame 10 with the medium of upper links 17 and lower links 18 at points between the ends of the grabs. Bolts 19 connect the grabs with the forward ends of the links 17, 18 and bolts 19$^a$ connect the opposite ends of the said links with the forward extensions 11$^a$ of the flange 11. Additional links 21 connect the grabs 15 with the flange 13 of the cross bar 12. To secure the links 21, bolts 22 pass through the same and through the grabs 15, adjacent to the inner ends of the grabs, while bolts 23 connect the opposite ends of the links with the flange 13. Washers or fillers 24, 25 may be employed on the bolts 19$^a$ between the links. A driving head 16$^a$, is formed at the juncture of each spur 16, with the main arm of the grab 15. The said head presents a back surface 16$^b$, to receive a blow to drive the spur into a tree. Also, on the head, a flange 16$^c$, is produced at a suitable angle to receive a blow for knocking the spur out of a tree.

By the described arrangement of the grabs, the spurs 16 thereof may readily be driven into the tree by a blow of an axe or driven out of a tree. When the grabs have been driven into the tree, as indicated in Fig. 1, the adjacent inner ends of the grabs may be connected by a chain 20, which is here shown as secured at one end by a lug 15$^a$, a line of the chain being brought over a lug or pin 15$^b$ on the extreme inner end of the other grab 15.

In order to sustain the frame 10 in substantially horizontal position and afford firm support therefor, a prop or leg 26 is employed, having suitable pivotal connection at its upper end with the frame 10, and pointed at its lower end to penetrate the tree trunk at a point below the grabs 15. In the illustrated construction, the upper end of the prop 26 is forked as at 26ª, the terminals 27 of the fork being inturned toward each other and journaled in brackets 28, secured to the frame 10 as by rivets 28ª. The pivotal connection of the prop 26 permits the same to be folded, when the structure is not in use, to a plane approximately parallel with and adjacent to the plane of the grabs 15. In the folded position of the prop, it is arranged to present an obstruction to the inner ends of the grabs 15 whereby to prevent the latter from moving on their supports, for which purpose a pin 29 on the prop is formed with curved bars or heads 30, presenting members each side of the pin 29, adapted to lie in front of the inner ends of the grabs 15 when the said grabs are thrown to the outer positions as illustrated in Fig. 3.

To retain the prop 26 in the folded position, notches 31 are formed in the vertical members of the cross bar 12 (see Fig. 3), into which notches the fork members 26ª of the prop are received. On the member 12 also, are latches 32, the outer ends of which present terminal members 33, adapted to overlie the fork members 26ª after the said fork members are received in the notches 31. The latch members 32 are under the influence of a compression spring 34, surrounding a pin 36, which extends through lugs 37 on said latches. A sliding connection is established between the latches 32 and the frame member 12 by means of set screws 38 of the said member 12, and slots 39 in the said latches. Thus, in order to release the prop 26 and swing the same downwardly to an inclined position to penetrate the tree trunk, as indicated in Fig. 2, the lugs 37 are grasped and the latches moved toward each other against the pressure of the spring 34.

The platform or tree board proper, designated generally by the numeral 40, has a swiveled connection with the board frame, also a pivotal connection. In the present example a plate 41 is applied to the upper side of the board and secured in any suitable manner and a hinge leaf 42 is secured or formed upon the said frame 41 and presents hinge knuckles 43 between which is received the eye of an eye-bolt 44, a hinge bolt or pin 45 being passed through the said knuckles and eye. The eye-bolt 44, at its lower end, passes through the flange 13 and is secured by a nut 46 or equivalent means. Thus a swiveled connection is established between the bolt and the flange 13 for swinging the board laterally over the frame 10 to either side through an angle to so dispose the board in positions to permit the tree feller to operate on the tree at opposite sides. The hinge connection between the board 40 and the eye-bolt 44 permits the board to be raised and lowered and facilitate the movement thereof from side to side.

I provide latch devices to retain the board 40 in adjusted position as well as a latch trip to release the latch. The said latch trip device may be arranged as shown, in which a latch bolt 47 has sliding movement in a housing 48, secured by screws 49 or equivalent means to the underside of the board 40. The reduced end 47ª of the latch bolt is adapted to be received in any one of a curved series of notches 50 in the flange 11. The bolt is under the influence of an expansion spring 51, which surrounds a pin 52, integral with the said latch bolt.

To trip the latch bolt and disengage it from a notch 50, a pedal 53 is provided with a depending trip 54, extending downwardly through a vertical slot 55, formed in the cross bar 41ª of the plate 41 and through a corresponding slot in the board 40, as clearly shown in Fig. 2, said trip being pivoted by a pin 56, and presenting a toe 54ª lying adjacent to a lug 57 of the latch bolt 47. Thus a depression of the pedal 53 by the workman will withdraw the latch bolt against the tension of the spring 51 and permit the board 40 to be swung to either side of the median line of the sector-shaped frame 10. It is to be understood that the frame 10 at either side of the board, affords temporary standing room for the workman while he swings the board 40 toward the opposite side of the tree. After adjustment the board constitutes a firm platform. The board 40 may have a wear-iron 40ª on the underside to bear on the flange 11.

It will be readily understood that by the improved device, the grabs 15 may be readily driven into the tree at the desired position without loss of time and the prop 26 adjusted to sustain the frame 10 and the board 40. The adjustment of the board 40 to the desired angular position can be effected with facility and folded. When the board is not in use or is to be carried, the leg 26 is folded and latched. By causing the prop to hold the grabs against movement the structure with the folded prop, can be conveniently carried without danger of injury by movement of the grabs.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. A tree board structure including a platform, a support therefor, grabs on said support movable toward and from each other to be driven into a tree or withdrawn therefrom, a prop pivotally connected with the support and folded to a position adjacent to the grabs or at an angle thereto, and means controlled by the prop to hold the grabs against movement when the prop is in folded position.

2. A tree board structure including a platform, a support therefor, grabs on said support movable toward and from each other to be driven into a tree or withdrawn therefrom, and a prop pivotally connected with the support and movable to a position adjacent to the grabs or at an angle thereto, the said prop having grab-retaining means thereon and movable therewith to and from the grabs.

3. A tree board structure including a platform, a support therefor, grabs pivotally connected with the support and adapted at one end for engagement with a tree, the opposite ends of the grabs having lugs thereon, and a prop pivoted to said support to swing to a position adjacent to the grabs, or at an angle thereto, said prop having a member movable therewith and positioned thereon to lie adjacent to the lugs of the grabs to prevent movement of the latter.

4. A tree board structure including a support, means to sustain the support on a tree, a platform connected with the support for lateral adjustment thereon, a spring pressed latch slidably carried by the platform at the underside and adapted to engage the support in different positions on the platform, and a pedal pivoted on the platform and movable therewith, said pedal being disposed at the upper side of said platform, the said latch having an upwardly projecting member, said platform having a vertical opening receiving said member, and the pedal having a depending member extending into said opening and adapted to engage the said member of the latch to release the said latch.

In testimony whereof I have signed my name to this specification in the presence of two subscribing witnesses.

JOHN SAMUELSON.

Witnesses:
G. H. BACKMAN,
SAM A. BACKMAN.

Copies of this patent may be obtained for five cents each, by addressing the "Commissioner of Patents, Washington, D. C."